(12) United States Patent
Wang et al.

(10) Patent No.: US 11,533,493 B2
(45) Date of Patent: Dec. 20, 2022

(54) METHOD OF ADDING ENCODED RANGE-OF-INTEREST LOCATION, TYPE, AND ADJUSTABLE QUANTIZATION PARAMETERS PER MACROBLOCK TO VIDEO STREAM

(71) Applicants: Minsheng Wang, Guangzhou (CN); Maojian Xiang, Guangzhou (CN); Xiaojun Liu, Guangzhou (CN)

(72) Inventors: Minsheng Wang, Guangzhou (CN); Maojian Xiang, Guangzhou (CN); Xiaojun Liu, Guangzhou (CN)

(73) Assignee: SHANDONG RUIXIN SEMICONDUCTOR TECHNOLOGY CO., LTD, Rizhao (CN)

( * ) Notice: Subject to any disclaimer, the term of this patent is extended or adjusted under 35 U.S.C. 154(b) by 0 days.

(21) Appl. No.: 17/158,102

(22) Filed: Jan. 26, 2021

(65) Prior Publication Data
US 2021/0176476 A1 Jun. 10, 2021

Related U.S. Application Data

(63) Continuation of application No. 16/868,762, filed on May 7, 2020, now Pat. No. 10,939,126.

(30) Foreign Application Priority Data

Dec. 9, 2019 (CN) .......................... 201911248643.7

(51) Int. Cl.
*H04N 19/176* (2014.01)
*H04N 19/124* (2014.01)

(52) U.S. Cl.
CPC ......... *H04N 19/176* (2014.11); *H04N 19/124* (2014.11)

(58) Field of Classification Search
CPC ..... H04N 19/176; H04N 19/17; H04N 19/124
See application file for complete search history.

(56) References Cited

U.S. PATENT DOCUMENTS 6,801,665 B1 * 10/2004 Atsumi ................ H04N 19/126
375/E7.064
9,704,270 B1 * 7/2017 Main ....................... G06T 15/60
(Continued)

FOREIGN PATENT DOCUMENTS

CN          104065964 A  *  9/2014
WO     WO-2017140946 A1  *  8/2017

OTHER PUBLICATIONS

Chen, Mingliang et al. "An efficient coding method for coding Region-of-Interest locations in AVS2." 2014 IEEE International Conference on Multimedia and Expo Workshops (ICMEW) (2014): 1-5. (Year: 2014).*

(Continued)

*Primary Examiner* — Michael Robert Cammarata
(74) *Attorney, Agent, or Firm* — IPro, PLLC

(57) ABSTRACT

A video encoding method is provided in the present invention. The method includes: determining a range of interest ROI in an $i^{th}$ frame, wherein the ROI comprises at least one ROI macroblock; extracting characteristic information of the at least one ROI macroblock, wherein the characteristic information comprises location information and type information of the at least one ROI macroblock; determining a quantization parameter QP corresponding to each of the at least one ROI macroblock; encoding the characteristic information of the at least one ROI macroblock according to the determined QP corresponding to each ROI macroblock, to obtain an ROI characteristic stream of the $i^{th}$ frame; and adding, to a video stream of the $i^{th}$ frame, the QP corresponding to each ROI macroblock and the ROI characteristic stream of the $i^{th}$ frame, to perform sending, wherein the (Continued)

video stream of the $i^{th}$ frame is obtained by encoding the ROI and a non-ROI comprised in the $i^{th}$ frame.

1 Claim, 9 Drawing Sheets

(56) References Cited

U.S. PATENT DOCUMENTS

| | | | | |
|---|---|---|---|---|
| 2006/0215753 | A1* | 9/2006 | Lee | H04N 19/17 |
| | | | | 375/E7.182 |
| 2008/0165861 | A1* | 7/2008 | Wen | H04N 19/176 |
| | | | | 375/E7.176 |
| 2011/0235706 | A1* | 9/2011 | Demircin | H04N 19/17 |
| | | | | 375/240.03 |
| 2014/0079118 | A1* | 3/2014 | Dedeoglu | H04N 19/124 |
| | | | | 375/240.08 |
| 2015/0208095 | A1* | 7/2015 | Schierl | H04N 19/423 |
| | | | | 375/240.28 |
| 2015/0237351 | A1* | 8/2015 | Lee | H04N 19/156 |
| | | | | 375/240.26 |
| 2017/0085892 | A1* | 3/2017 | Liu | H04N 19/11 |
| 2017/0347026 | A1* | 11/2017 | Hannuksela | H04N 21/816 |
| 2018/0249163 | A1* | 8/2018 | Curcio | H04N 13/332 |
| 2019/0043201 | A1* | 2/2019 | Strong | G06K 9/6228 |
| 2019/0253719 | A1* | 8/2019 | Wang | H04N 19/167 |
| 2019/0297339 | A1* | 9/2019 | Hannuksela | H04N 19/59 |
| 2020/0092600 | A1* | 3/2020 | Di | H04N 21/4348 |
| 2021/0110191 | A1* | 4/2021 | Gruteser | G06V 20/20 |
| 2021/0168376 | A1* | 6/2021 | Zhu | H04N 19/176 |

OTHER PUBLICATIONS

C. Wu and P. Su, "A Region of Interest Rate-Control Scheme for Encoding Traffic Surveillance Videos," 2009 Fifth International Conference on Intelligent Information Hiding and Multimedia Signal Processing, 2009, pp. 194-197, doi: 10.1109/IIH-MSP.2009.114. (Year: 2009).*

Mingliang Chen, Weiyao Lin, Xiaozhen Zheng and Xu Chen, "A new algorithm for compressing massive region-of-interest location information in videos," 2013 IEEE International Conference on Multimedia and Expo Workshops (ICMEW), 2013, pp. 1-6, doi: 10.1109/ICMEW.2013.6618444. (Year: 2013).*

Y. Wang, M. O'Neill and F. Kurugollu, "New FMO type to flag ROI in H.264/AVC," 2014 5th European Workshop on Visual Information Processing (EUVIP), 2014, pp. 1-5, doi: 10.1109/EUVIP.2014. 7018403. (Year: 2014).*

H. M. Aziz, M. Fiedler, H. Grahn and L. Lundberg, "Adapting the Streaming Video Based on the Estimated Position of the Region of Interest," 2012 Eighth International Conference on Signal Image Technology and Internet Based Systems, 2012, pp. 1-7, doi: 10.1109/ SITIS.2012.11. (Year: 2012).*

Y. Liu, Z. G. Li and Y. C. Soh, "Region-of-Interest Based Resource Allocation for Conversational Video Communication of H.264/ AVC," in IEEE Transactions on Circuits and Systems for Video Technology, vol. 18, No. 1, pp. 134-139, Jan. 2008, doi: 10.1109/ TCSVT.2007.913754. (Year: 2008).*

D. Grois, E. Kaminsky and O. Hadar, "Dynamically adjustable and scalable ROI video coding," 2010 IEEE International Symposium on Broadband Multimedia Systems and Broadcasting (BMSB), 2010, pp. 1-5, doi: 10.1109/ISBMSB.2010.5463115. (Year: 2010).*

P. Wu and H. H. Chen, "Frame-Layer Constant-Quality Rate Control of Regions of Interest for Multiple Encoders With Single Video Source," in IEEE Transactions on Circuits and Systems for Video Technology, vol. 17, No. 7, pp. 857-867, Jul. 2007, doi: 10.1109/TCSVT.2007.899605. (Year: 2007).*

Ling Yang, Li Zhang, Siwei Ma and Debin Zhao, "A ROI quality adjustable rate control scheme for low bitrate video coding," 2009 Picture Coding Symposium, 2009, pp. 1-4, doi: 10.1109/PCS.2009. 5167372. (Year: 2009).*

M. Meddeb, M. Cagnazzo and B. Pesquet-Popescu, "Region-of-interest based rate control scheme for high efficiency video coding," 2014 IEEE International Conference on Acoustics, Speech and Signal Processing (ICASSP), 2014, pp. 7338-7342, doi: 10.1109/ ICASSP.2014.6855025. (Year: 2014).*

* cited by examiner

METHOD OF ADDING ENCODED RANGE-OF-INTEREST LOCATION, TYPE, AND ADJUSTABLE QUANTIZATION PARAMETERS PER MACROBLOCK TO VIDEO STREAM

CROSS REFERENCE TO RELATED APPLICATION

This application is a continuation of U.S. patent application Ser. No. 16/868,762, filed on May 7, 2020, which claims priority to Chinese Patent Application No. 201911248643.7, filed on Dec. 9, 2019, both of which are hereby incorporated by reference in their entireties.

FIELD OF THE INVENTION

The present invention relates to video encoding technologies, and in particular, to a range-of-interest information encoding and decoding method and a video encoding and decoding apparatus.

BACKGROUND OF THE INVENTION

Range of interest (Range of interest, ROI for short) video encoding is an important research field of low-rate video encoding. Human eyes have a visual range of interest, that is, human eyes are interested in different areas of one image at different degrees. For example, both a human face in a video conference and a lesion part in a medical image are ranges of interest. A range-of-interest-based video encoding method can effectively improve subjective experience quality of an image obtained by low-rate encoding. Range-of-interest information includes location and type information of a range of interest.

In an existing ROI-based video encoding technology, usually, macroblocks in a video frame are first categorized according to some categorization criteria. The categorization criteria are obtained through ROI detection or analysis. An ROI macroblock and a BG macroblock are determined according to the categorization criteria, where the range-of-interest macroblock includes location and type information. Each macroblock may be defined as R={x, y, w, h, t}, where x and y respectively indicate horizontal and vertical coordinates of an upper-left corner of a range of interest, w indicates a width of the range of interest, h indicates a length of the range of interest, and t indicates a type of the range of interest (which can be customized, for example, a human face or a human hand). Then, a corresponding quantization parameter (quantization parameter, QP for short) is allocated according to a type of each macroblock. A small quantization parameter is used for the range of interest, and a large quantization parameter is used for a background. Precision decreases as the quantization parameter increases. Next, all macroblocks in video frames of an original video are encoded by using the QP corresponding to each macroblock, to form a video bit stream, and the video bit stream is sent to a decoder end. At the decoder end, video frames of the video bit stream are decoded by using the QP corresponding to each macroblock, to restore original video frame data.

However, in the foregoing ROI-based video encoding technology, there may be a deviation between ROI location and type information extracted by the decoder end after decoding and ROI location and type information in the original video frames.

SUMMARY OF THE INVENTION

An embodiment of the present invention provides a range-of-interest information encoding method, and the method includes:

determining a range of interest ROI in an $i^{th}$ frame, wherein the ROI comprises at least one ROI macroblock;

extracting characteristic information of the at least one ROI macroblock, wherein the characteristic information comprises location information and type information of the at least one ROI macroblock;

determining a quantization parameter QP corresponding to each of the at least one ROI macroblock;

encoding the characteristic information of the at least one ROI macroblock according to the determined QP corresponding to each ROI macroblock, to obtain an ROI characteristic stream of the $i^{th}$ frame; and adding, to a video stream of the $i^{th}$ frame, the QP corresponding to each ROI macroblock and the ROI characteristic stream of the $i^{th}$ frame, to perform sending, wherein the video stream of the $i^{th}$ frame is obtained by encoding the ROI and a non-ROI comprised in the $i^{th}$ frame.

Based on the foregoing solution, in embodiments of the present invention, ROI location information and type information included in an ROI of an $i^{th}$ frame are directly encoded according to a QP of an ROI macroblock of the $i^{th}$ frame, to obtain an ROI characteristic stream of the $i^{th}$ frame; the ROI characteristic stream of the $i^{th}$ frame and the QP of each ROI macroblock are added to a video stream of the $i^{th}$ frame to perform sending, so that a decoding apparatus at a receive end can directly obtain the ROI characteristic stream and the QP of each ROI macroblock from the video stream of the $i^{th}$ frame, and decode the ROI characteristic stream according to the QP of each ROI macroblock, to obtain characteristic information of the ROI macroblock and further obtain location information and type information of the ROI macroblock. This resolves a prior-art problem that there may be a deviation when a decoder end extracts location information and type information of an ROI macroblock, improves accuracy of obtaining location information and type information of an ROI macroblock by a decoder end, and helps improve decoding efficiency of obtaining location information and type information of an ROI macroblock.

DETAILED DESCRIPTION OF THE EMBODIMENTS

Figure 1A:
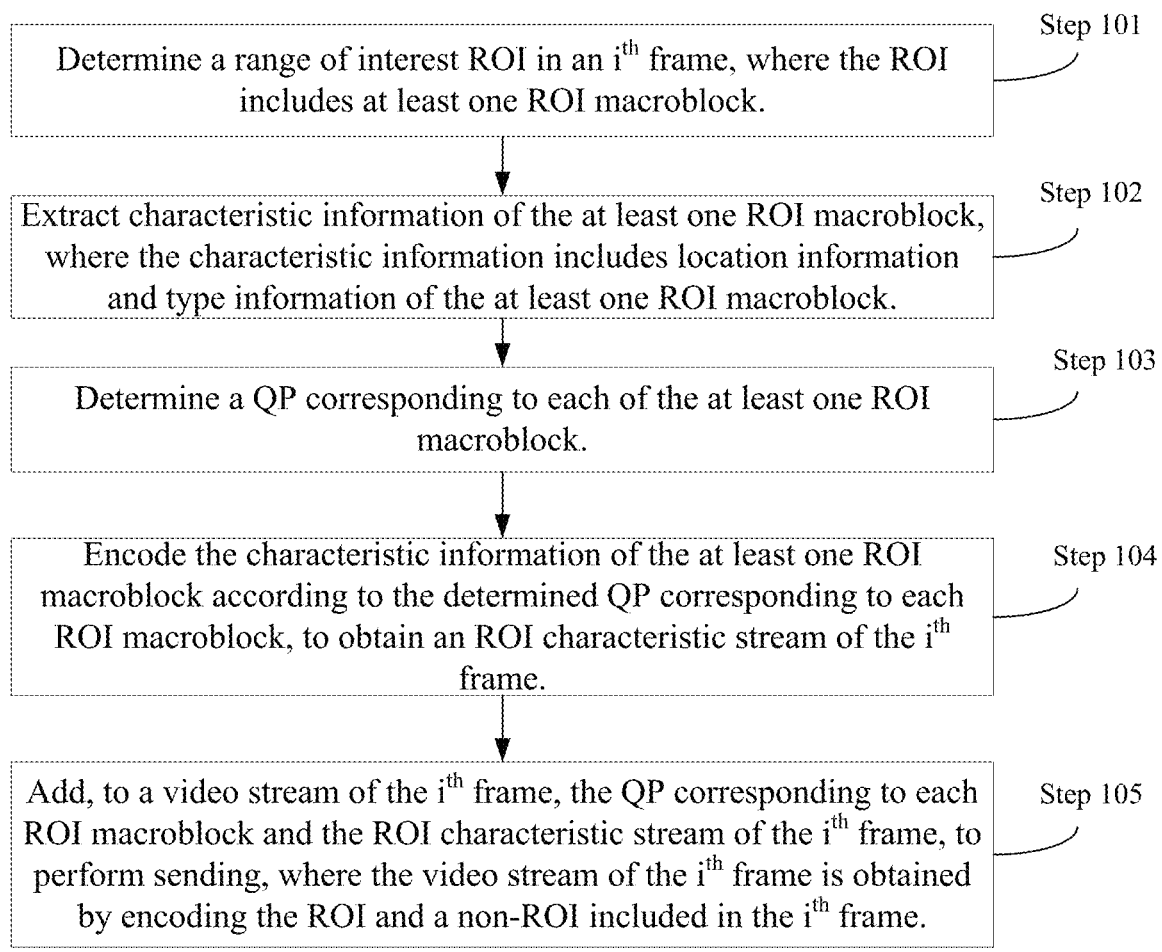
FIG. 1A is a flowchart of Embodiment 1 of an ROI information encoding method according to an embodiment of the present invention.

FIG. 1A is a flowchart of Embodiment 1 of an ROI information encoding method according to an embodiment of the present invention. The method embodiment may be performed by an encoder. As shown in FIG. 1A, the method embodiment includes the following steps.

Step 101: Determine a range of interest ROI in an $i^{th}$ frame, where the ROI includes at least one ROI macroblock.

For example, a segment of a video sequence includes a plurality of video frames. The $i^{th}$ frame is any video frame in the video sequence. i is a positive integer. Any frame may include an ROI and a non-ROI, where the non-ROI may also be referred to as a BG.

The ROI in the $i^{th}$ frame may be detected by using an existing automatic detection technology in the prior art, or may be determined by using an existing motion or texture analysis technology. This is not limited in the present invention.

Step 102: Extract characteristic information of the at least one ROI macroblock, where the characteristic information includes location information and type information of the at least one ROI macroblock.

The characteristic information R of the ROI macroblock may be defined as R={x, y, w, h, t}, where the first four items indicate the location information, and the fifth item indicates the type information. x and y in the first four items respectively indicate horizontal and vertical coordinates of an upper-left corner of the range of interest, w indicates a width of the range of interest, h indicates a length of the range of interest, and the fifth item t indicates a type of the range of interest (which can be customized or adjusted depending on an actual requirement, for example, a human face or a human hand). Different priorities may be defined according to the type information of the ROI.

Step 103: Determine a QP corresponding to each of the at least one ROI macroblock.

The QP corresponding to each of the at least one ROI macroblock may be adjusted according to type information of the ROI macroblock. As a priority corresponding to the type information of the ROI macroblock becomes higher, the QP corresponding to the ROI macroblock becomes smaller.

For example, the QP corresponding to the ROI macroblock may be determined in the following steps:

Step 103a: Allocate a corresponding priority to the ROI macroblock according to the type information of the ROI macroblock. (For example, if the type information is a human face or a human hand, allocate a highest priority to the ROI macroblock; or if the type information is a blackboard, allocate a second highest priority to the ROI macroblock. A lowest priority may be allocated to a non-ROI, that is, a largest QP is allocated to the non-ROI.)

Step 103b: Allocate different QPs according to different priorities of ranges of interest. (For example, set a QP of an ROI with a highest priority to be most precise (that is, smallest), set a QP of a range with a second highest priority to be second smallest, and set a QP of a background to be largest). In this embodiment, a value of a quantization parameter corresponding to each priority may be pre-defined.

Figure 1B:
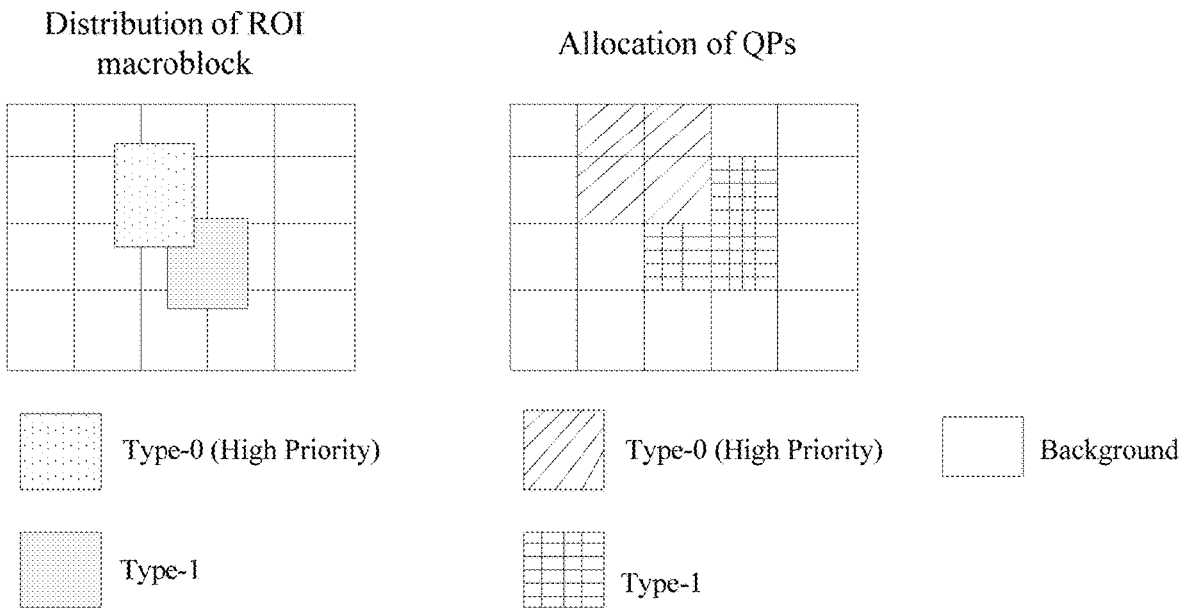
FIG. 1B is a schematic diagram of ROI macroblock distribution and QPs according to the method embodiment shown in FIG. 1A.

Step 103c: Establish a correspondence between the QPs of the ranges of interest determined in step 103b and macroblocks. A boundary of a range of interest may not necessarily be a boundary of a macroblock. Therefore, when a quantization parameter is selected for the corresponding macroblock, a quantization parameter corresponding to a range with a highest priority in the macroblock may be selected. That is, if a macroblock includes a pixel of a range with a highest priority, a quantization parameter of the macroblock is set as a quantization parameter with a highest priority. As shown in FIG. 1B, if an ROI macroblock covers ranges with different priorities, for example, a third ROI macroblock in a second row includes a type-0 range, a type-1 range, and a background, a priority corresponding to the type 0 with a highest priority is used as a priority of the current macroblock, and a QP of the macroblock is determined according to the priority.

Step 104: Encode the characteristic information of the at least one ROI macroblock according to the determined QP corresponding to each ROI macroblock, to obtain an ROI characteristic stream of the $i^{th}$ frame.

The characteristic information of the ROI macroblock of the $i^{th}$ frame may be encoded by using a universal variable length code (Universal variable length code, UVLC for short).

Step 105: Add, to a video stream of the $i^{th}$ frame, the QP corresponding to each ROI macroblock and the ROI characteristic stream of the $i^{th}$ frame, to perform sending, where the video stream of the $i^{th}$ frame is obtained by encoding the ROI and a non-ROI included in the $i^{th}$ frame.

The ROI and the non-ROI included in the $i^{th}$ frame may be encoded according to the QP corresponding to the ROI macroblock of the $i^{th}$ frame and a QP corresponding to a non-ROI macroblock, to obtain the video stream of the $i^{th}$ frame. A method for obtaining the video stream of the $i^{th}$ frame is not limited in the present invention.

Preferably, step 105 of adding, to a video stream of the $i^{th}$ frame, the QP corresponding to each ROI macroblock and the ROI characteristic stream of the $i^{th}$ frame, to perform sending includes: adding, to a frame header of the ROI video stream of the $i^{th}$ frame, the QP corresponding to each ROI macroblock and the ROI characteristic stream of the $i^{th}$ frame, to perform sending. During encoding, a corresponding QP is not encoded in each macroblock; instead, the QP used by the current frame is added to the frame header, so that a quantity of bits of an encoded QP can be effectively reduced.

Usually, a video stream of the $i^{th}$ frame that carries the QP corresponding to each ROI macroblock and the ROI characteristic stream of the $i^{th}$ frame may be sent to a decoding apparatus at a receive end, so that the decoding apparatus can obtain, from the ROI characteristic stream of the $i^{th}$ frame by decoding according to the QP corresponding to each ROI macroblock, the characteristic information of the at least one ROI macroblock of the $i^{th}$ frame, and further obtain the location information and the type information of the at least one ROI macroblock.

In this method embodiment, the ROI location information and type information included in the ROI of the $i^{th}$ frame are directly encoded according to the QP of the ROI macroblock of the $i^{th}$ frame, to obtain the ROI characteristic stream of the $i^{th}$ frame; the ROI characteristic stream of the $i^{th}$ frame and the QP of each ROI macroblock are added to the video stream of the $i^{th}$ frame, to perform sending, so that the decoding apparatus at the receive end can directly obtain the ROI characteristic stream and the QP of each ROI macroblock from the video stream of the $i^{th}$ frame, and decode the ROI characteristic stream according to the QP of each ROI macroblock, to obtain the characteristic information of the ROI macroblock and further obtain the location information and the type information of the ROI macroblock. This resolves a prior-art problem that there may be a deviation when a decoder end extracts location information and type information of an ROI macroblock, improves accuracy of obtaining location information and type information of an ROI macroblock by a decoder end, and helps improve decoding efficiency of obtaining location information and type information of an ROI macroblock.

Figure 2A:
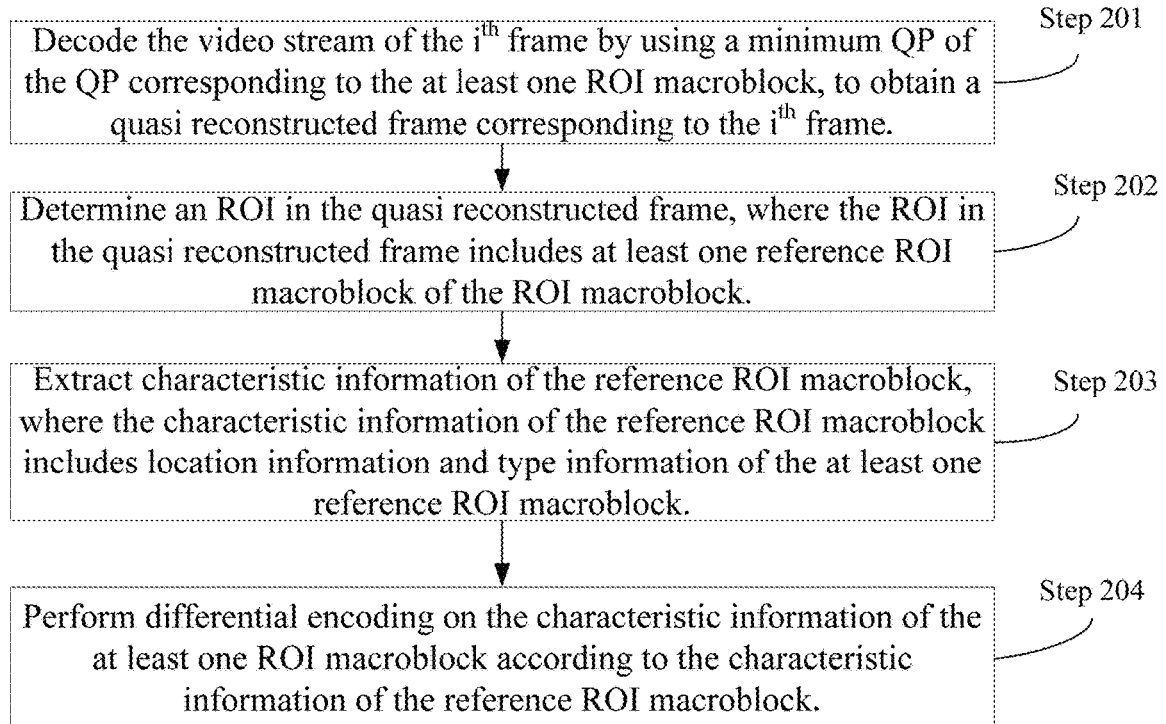
FIG. 2A is a flowchart of Embodiment 2 of an ROI information encoding method according to an embodiment of the present invention.

FIG. 2A is a flowchart of Embodiment 2 of an ROI information encoding method according to an embodiment of the present invention. This embodiment is a preferred implementation of step 104 of encoding the characteristic information of the ROI macroblock of the $i^{th}$ frame in the method embodiment shown in FIG. 1A. Differential encoding is used in this method embodiment. As shown in FIG. 2A, this method embodiment includes the following steps.

Step 201: Decode the video stream of the $i^{th}$ frame by using a minimum QP of the QP corresponding to the at least one ROI macroblock, to obtain a quasi reconstructed frame corresponding to the $i^{th}$ frame.

The quasi reconstructed frame is obtained by decoding the video stream of the $i^{th}$ frame by using the minimum QP, and is not a real reconstructed frame. A reconstructed frame is obtained by decoding the video stream of the $i^{th}$ frame by using the QP corresponding to each ROI macroblock and the QP corresponding to the non-ROI. However, a video image effect of the quasi reconstructed frame is close to that of the reconstructed frame. ROI information extracted from the quasi reconstructed frame is close to ROI information extracted from the reconstructed frame.

Step 202: Determine an ROI in the quasi reconstructed frame, where the ROI in the quasi reconstructed frame includes at least one reference ROI macroblock of the ROI macroblock.

Herein, the ROI in the quasi reconstructed frame may be determined by using a prior art that is the same as that in step 101. Details are not described herein again.

Step 203: Extract characteristic information of the reference ROI macroblock, where the characteristic information of the reference ROI macroblock includes location information and type information of the at least one reference ROI macroblock.

The characteristic information R* of the reference ROI macroblock may be defined as R*={x*, y*, w*, h*, t*}, where the first four items indicate the location information, and the fifth item indicates the type information. x* and y* in the first four items respectively indicate horizontal and vertical coordinates of an upper-left corner of the reference ROI macroblock, w* indicates a width of the reference ROI macroblock, h* indicates a length of the reference ROI macroblock, and the fifth item t* indicates a type of the reference ROI macroblock.

Step 204: Perform differential encoding on the characteristic information of the at least one ROI macroblock according to the characteristic information of the reference ROI macroblock.

Further, step 204 includes:

determining, in the at least one reference ROI macroblock of the ROI macroblock, a reference ROI macroblock corresponding to each ROI macroblock, where there is a minimum location difference between the ROI macroblock and the corresponding reference ROI macroblock;

determining a quantity corresponding to each reference ROI macroblock, where the corresponding quantity is a quantity of ROI macroblocks corresponding to the reference ROI macroblock; and performing differential encoding on the characteristic information of the at least one ROI macroblock by using each reference ROI macroblock as a basic unit, to obtain a basic unit code; encoding, into the basic unit code, the quantity corresponding to the reference ROI macroblock and a corresponding quantity of differential encoding segments; and encoding, into the differential encoding segment, characteristic information differences between the ROI macroblock and the reference ROI macroblock, where the characteristic information differences include location information differences and a type information difference.

The corresponding quantity may be 0, 1, or any integer greater than 1.

The minimum location difference indicates that the reference ROI macroblock is a macroblock closest to the ROI macroblock of the $i^{th}$ frame, that is, a macroblock with a minimum location difference. A location difference may be represented by an OP in the following formula (1):

$$OP(R,R^*)=(x-x^*)^2+(y-y^*)^2+(w-w^*)^2+(h-h^*)^2 \qquad (1)$$

To determine a reference ROI macroblock corresponding to each ROI macroblock, the location information of the ROI macroblock may be compared with location information of all reference ROI macroblocks in the quasi reconstructed frame, and a reference ROI macroblock in the quasi reconstructed frame that has a minimum OP with the ROI macroblock is a reference ROI macroblock corresponding to the ROI macroblock.

A video frame scanning manner may determine a sequence in which ROI macroblocks encounter reference ROI macroblocks in a scanning process. The video frame scanning manner may be row scanning, column scanning, or diagonal scanning. In addition, a same video frame scanning manner is used at the receive end, to ensure that a decoding sequence is consistent with an encoding sequence. The scanning manner is not limited in the present invention. When the differential encoding is performed on the characteristic information of the at least one ROI macroblock by using each reference ROI macroblock as a basic unit, a sequence of encountering reference ROI macroblocks during video frame scanning may be used as an encoding sequence of the reference ROI macroblocks.

Preferably, the encoding the quantity corresponding to the reference ROI macroblock into the basic unit code may be: encoding a quantity equal to the quantity corresponding to the reference ROI macroblock minus 1. Correspondingly, during encoding, −1, 0, or any positive integer may be encoded. Because the quasi reconstructed frame is close to the reconstructed frame, the corresponding quantity is 1 in most cases. During encoding, if the quantity equal to the corresponding quantity minus 1 is encoded, a code rate can be effectively reduced.

It should be noted that, if the quantity equal to the quantity corresponding to the reference ROI macroblock minus 1 is encoded into the basic unit code, during decoding, the quantity needs to be increased by 1 to obtain the correct quantity of ROI macroblocks corresponding to the reference ROI macroblock, and splitting is performed correctly according to the quantity of ROI macroblocks corresponding to the reference ROI macroblock.

Further, the encoding method embodiment further includes:

determining a quantity of reference ROI macroblocks included in the ROI in the quasi reconstructed frame; and encoding the quantity of reference ROI macroblocks into the ROI characteristic stream of the $i^{th}$ frame, where the ROI characteristic stream of the $i^{th}$ frame includes basic unit codes whose quantity is the same as the quantity of reference ROI macroblocks.

Preferably, the encoding method embodiment further includes:

encoding a flag bit into the differential encoding segment, where the flag bit is used to indicate whether the location information differences included in the characteristic information differences are all 0.

Preferably, if the location information differences are all 0, the step of encoding, into the differential encoding segment, characteristic information differences between the ROI macroblock and the reference ROI macroblock is skipped.

Specifically, if the location information differences are all 0, only a flag bit of 0 may be encoded; or if the location information differences are not all 0, a flag bit of 1 and the characteristic information differences may be encoded.

It should be noted that different values or characters may be assigned to the flag bit at an encoder end and the decoder end, to indicate whether the location information differences are all 0. This is not limited in the present invention.

Specifically, first, at the encoder end, a virtual decoder may be used to decode, by using the minimum QP of the $i^{th}$ frame, an encoded video stream to obtain the "quasi reconstructed frame", the ROI in the quasi reconstructed frame is determined, at least one macroblock included in the ROI is used as the reference ROI macroblock of the ROI macroblock of the $i^{th}$ frame, the characteristic information of each reference ROI macroblock is extracted, and the characteristic information of the reference ROI macroblock is used as reference characteristic information for subsequently performing differential encoding on the characteristic information of the ROI macroblock of the $i^{th}$ frame. The characteristic information of the reference ROI macroblock includes the location information and the type information of the reference ROI macroblock.

Next, the reference ROI macroblock corresponding to the ROI macroblock is determined: A location difference OP between any ROI macroblock R in the $i^{th}$ frame and each reference ROI macroblock in the quasi reconstructed frame is calculated, where a reference ROI macroblock R* in the quasi reconstructed frame that has a minimum OP is a reference ROI macroblock corresponding to the ROI macroblock during differential encoding.

Figure 2B:
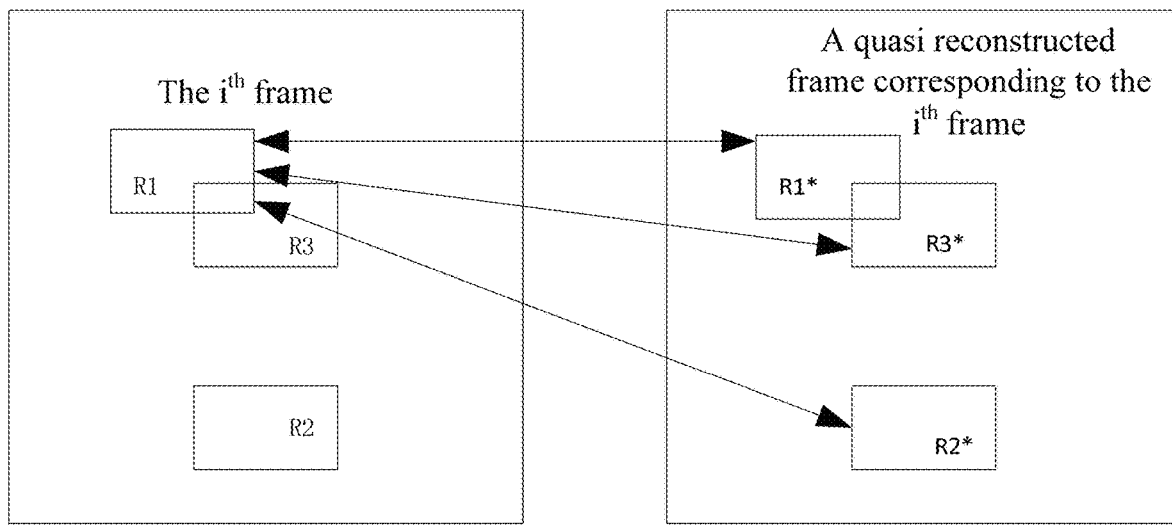
FIG. 2B is a schematic diagram of determining a reference ROI macroblock corresponding to an ROI macroblock according to the method embodiment shown in FIG. 2A.
Figure 2C:
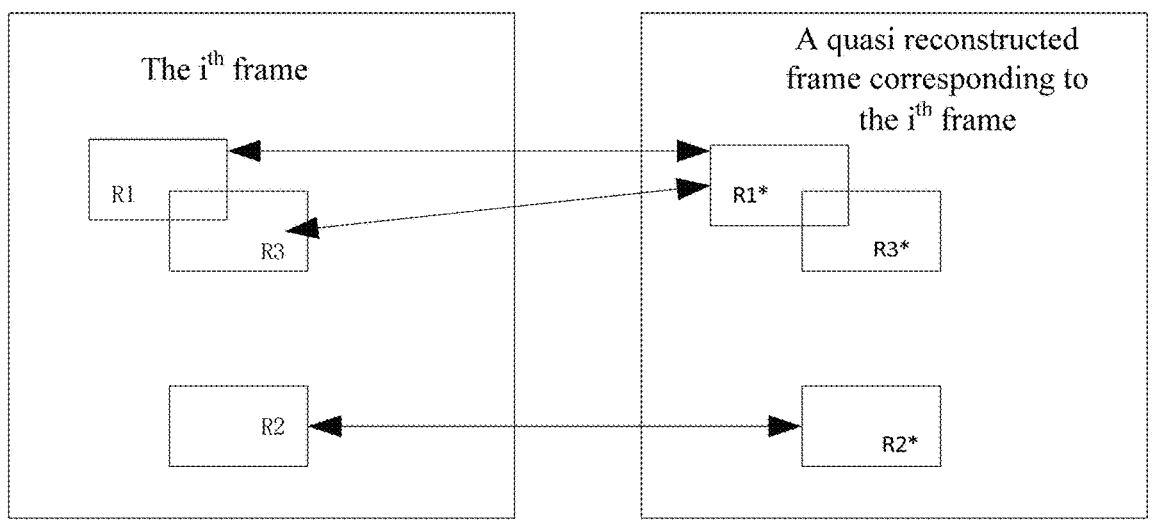
FIG. 2C is a schematic diagram of a correspondence between an ROI macroblock and a reference ROI macroblock according to the method embodiment shown in FIG. 2A.

Referring to the schematic diagram of distribution of ROI macroblocks and reference ROI macroblocks in FIG. 2B, the $i^{th}$ frame includes three ROI macroblocks: R1-R3, and the quasi reconstructed frame corresponding to the $i^{th}$ frame includes three reference ROI macroblocks: R1*-R3*. For example, to determine a reference ROI macroblock corresponding to R1, calculation is respectively performed between the location information of R1 and R1*, R2*, and R3*, to obtain OP11, OP12, and OP13; and according to the three OPs, it is determined that OP11 is a minimum OP, that is, there is a minimum location difference between R1 and R1*, and R1* is the reference ROI macroblock corresponding to R1. By using a similar step, it can be determined that reference ROI macroblocks corresponding to R2 and R3 are respectively R2* and R1*. Details are not described. A determined correspondence between the ROI macroblocks and the reference ROI macroblocks is shown in FIG. 2C. Based on this, a quantity corresponding to each reference ROI macroblock, namely, a quantity of ROI macroblocks corresponding to each reference ROI macroblock, may be determined. Quantities corresponding to R1*-R3* are respectively 2, 1, and 0. It can be learned that a reference ROI macroblock may be corresponding to one ROI macroblock, a plurality of ROI macroblocks, or no ROI macroblock.

Figure 2D:
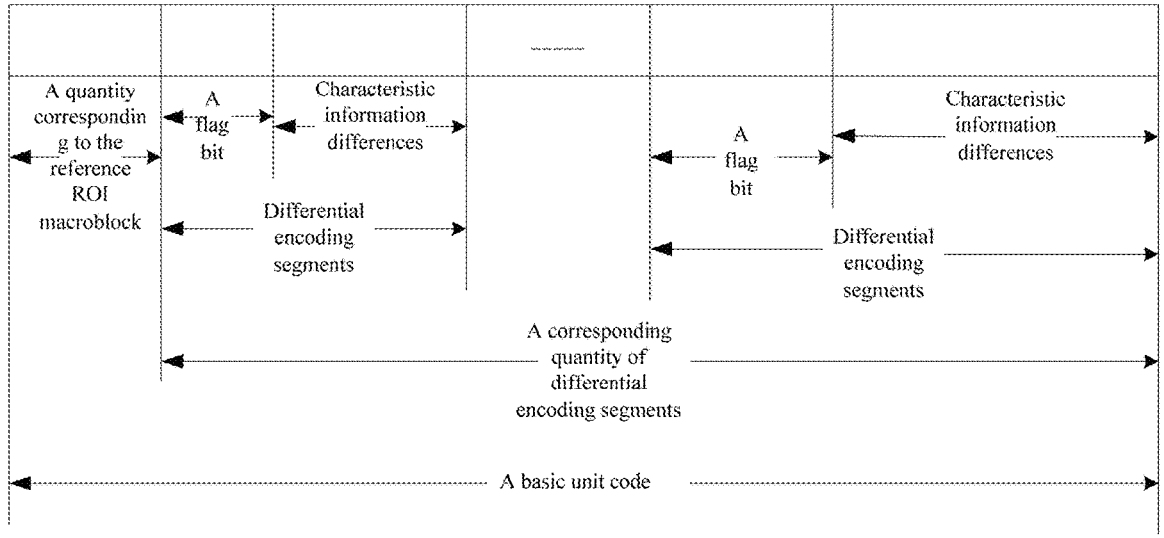
FIG. 2D is a schematic structural diagram of a basic unit code according to the method embodiment shown in FIG. 2A.

Then, by using each reference ROI macroblock as a basic unit, differential encoding is performed on each ROI macroblock corresponding to the reference ROI macroblock according to characteristic information of the reference ROI macroblock. A quantity corresponding to the reference ROI macroblock and a corresponding quantity of differential encoding segments are encoded in a basic unit code. The differential encoding segment includes characteristic information differences between the ROI macroblock and the reference ROI macroblock. Preferably, a flag bit may be further included before the characteristic information differences in the differential encoding segment, to indicate whether location information differences in the characteristic information differences are all 0. A schematic structural diagram of the basic unit code in this embodiment is shown in FIG. 2D. A sequence of basic unit codes in the ROI characteristic stream and a sequence of the differential encoding segments in the basic unit code may conform to an encoding sequence of the reference ROI macroblocks and the ROI macroblocks corresponding to the reference ROI macroblocks. The encoding sequence may be determined according to a sequence, determined by the video frame scanning manner, in which the reference ROI macroblocks encounter the ROI macroblocks corresponding to the reference ROI macroblocks in a scanning process.

The encoding sequence is described by assuming that video frame scanning is row scanning and by using R1-R3 and R1*-R3* in FIG. 2B as examples. A scanning process of row scanning is from left to right and from top to bottom. It can be sequentially determined that an encoding sequence of R1-R3 is from R1, R3, to R2, and an encoding sequence of R1*-R3* is from R1*, R3*, to R2*.

The characteristic information differences may be encoded into differences represented by the following formula (2):

$$R-R^*=\{x-x^*, y-y^*, w-w^*, h-h^*, t-t^*\} \qquad (2)$$

The first four items indicate location information differences between an ROI macroblock and a corresponding reference ROI macroblock, and the fifth item indicates a type information difference between the ROI macroblock and the corresponding reference ROI macroblock. If the first four items are all 0, only a flag bit of "0" may be encoded, and encoding of the characteristic information differences is skipped. If the first four items are not all 0, a flag bit of "1" is first encoded, and then the characteristic information differences are encoded.

For the type information difference of the ROI macroblock, if type information of the ROI macroblock is the same as type information of the reference ROI macroblock, the type information difference is encoded to 0; or if a priority of type information of the ROI macroblock is lower than that of type information of the reference ROI macroblock, the type information difference is encoded to a corresponding negative number.

Finally, the ROI characteristic stream of the $i^{th}$ frame is obtained according to the quantity of reference ROI macroblocks and the basic unit code corresponding to each reference ROI macroblock obtained in the foregoing step, and the ROI characteristic stream of the $i^{th}$ frame and all QPs corresponding to the ROI macroblocks of the $i^{th}$ frame are inserted into the frame header of the video stream of the $i^{th}$ frame to perform sending.

A specific encoding process is described by using the ROI macroblocks in FIG. 2C as examples. The ROI macroblocks R1-R3 of the $i^{th}$ frame are respectively: R1={100, 100, 100, 100, 1}, R2={199, 399, 200, 100, 0}, and R3={150, 150, 102, 99, 1}. The corresponding reference ROI macroblocks R1* and R2* in the quasi reconstructed frame corresponding to the $i^{th}$ frame are respectively: R1*={100, 100, 100, 100, 0} and R2*={200, 400, 200, 100, 0}. A specific process of performing differential encoding on characteristic information of R1-R3 is described by using an example in which video frame scanning is row scanning and R1*-R3* are basic units.

First, it is determined that a quantity of reference ROI macroblocks R1*-R3* is 3, and 3 is encoded. Next, the ROI macroblocks are encoded according to the encoding sequence of the reference ROI macroblocks, that is, from R1*, R3*, to R2*, and by using each reference ROI macroblock as a basic unit.

When differential encoding is performed on the ROI macroblocks by using R1* as a basic unit, R1* is corresponding to two ROI macroblocks: R1 and R3. In a basic unit code corresponding to R1*, a quantity corresponding to R1*, that is, 2, is first encoded, and then two differential encoding segments are encoded. Characteristic information differences between R1 and R1* are encoded into a first differential encoding segment. Because location information differences between R1 and R1* are all 0, only a flag bit of 0 is encoded, and encoding of the characteristic information differences of R1 is skipped. Then characteristic information differences between R3 and R1* are encoded into a second differential encoding segment. Because location information differences between R3 and R1* are not all 0, a flag bit of 1 is first encoded, and then the characteristic information differences between R3 and R1* are encoded. Therefore, a basic unit code corresponding to R1* is obtained: |2|0|1|50|50|2|−1|1|.

When differential encoding is performed on the ROI macroblocks by using R3* as a basic unit, R3* is not corresponding to any ROI macroblock, that is, a quantity of differential encoding segments is 0. In this case, only a corresponding quantity of 0 needs to be encoded into a basic unit code of R3*, and the basic unit code corresponding to R3* is obtained: |0|.

When differential encoding is performed on the ROI macroblocks by using R2* as a basic unit, R2* is corresponding to one ROI macroblock: R2. In a basic unit code corresponding to R2*, a corresponding quantity of 1 is first encoded; then a flag bit of 1 is encoded because location information difference residuals are not all 0; and then characteristic information differences are encoded, and the basic unit code corresponding to R2* is obtained: |1|1|−1|−1|0|0|0|.

Finally, with reference to the quantity of reference ROI macroblocks and the basic unit codes corresponding to R1*-R3*, an ROI characteristic stream code of the $i^{th}$ frame is: |3|2|0|1|50|50|2|−1|1|0|1|1|1|1|−1|−1|0|0|0|.

It should be noted that a quantity equal to the corresponding quantity minus 1 may also be encoded. In this case, an ROI characteristic stream code of the $i^{th}$ frame is: |3|1|0|1|50|50|2|−1|1|−1|0|1|−1|−1|0|0|0|. Considering that a correspondence in most cases is a one-to-one correspondence, encoding the quantity equal to the corresponding quantity minus 1 can further reduce the code rate.

During specific tests, a plurality of tests are performed on a personal computer (Personal Computer, PC for short) for videos having different content, different resolutions, and different quantities of ROI macroblocks. A code rate in the differential encoding method in this method embodiment is compared with that in a direct encoding method, in which four parameters of location information of a range of interest are directly written into a frame header of each frame by using a fixed-length encoding manner.

A test result indicates that the technical solution in this method embodiment is applicable to videos having different resolutions, and can improve encoding efficiency under different QPs. Especially when there is a large quantity of ROI macroblocks and a large QP difference, this method embodiment reduces the code rate by more than 15%, compared with directly encoding absolute values of an ROI location and type.

In this method embodiment, based on the method embodiment shown in FIG. 1A, at the encoder end, the ROI video stream of the $i^{th}$ frame is decoded by using the minimum QP to obtain the quasi reconstructed frame, and differential encoding is performed on the ROI macroblock of the $i^{th}$ frame by using the characteristic information of the ROI macroblock in the quasi reconstructed frame as reference characteristic information, to obtain the ROI characteristic stream of the $i^{th}$ frame, thereby further reducing the code rate of the ROI characteristic information. In addition, encoding is performed based on the quasi reconstructed frame, so that the decoder end can directly obtain the quasi reconstructed frame by using the minimum QP, and decode the ROI characteristic information based on the quasi reconstructed frame, so that decoding can be implemented without a need to learn about all macroblocks of the $i^{th}$ frame, including QPs corresponding to ROI macroblocks and QPs corresponding to non-ROI macroblocks, thereby further improving decoding efficiency.

Figure 3:
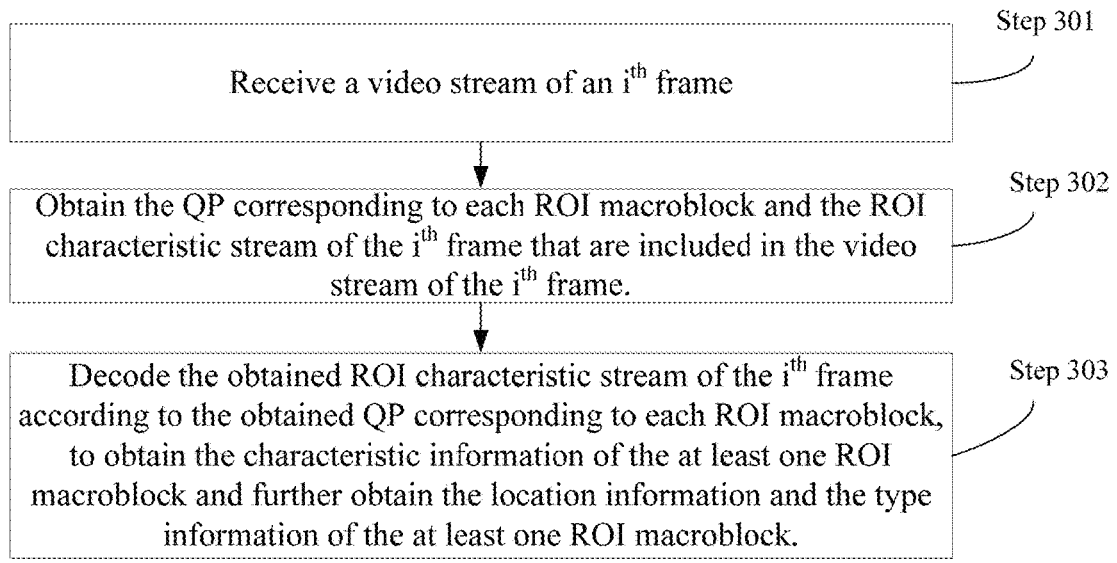
FIG. 3 is a flowchart of Embodiment 1 of an ROI information decoding method according to an embodiment of the present invention.

FIG. 3 is a flowchart of Embodiment 1 of an ROI information decoding method according to an embodiment of the present invention. This method embodiment is usually performed by a decoding apparatus, which performs a decoding step corresponding to the encoding apparatus in the method embodiment shown in FIG. 1A. As shown in FIG. 3, the decoding method embodiment includes the following steps.

Step 301: Receive a video stream of an $i^{th}$ frame, where the $i^{th}$ frame includes a range of interest ROI, the ROI includes at least one ROI macroblock, the video stream of the $i^{th}$ frame carries a quantization parameter QP corresponding to each ROI macroblock and an ROI characteristic stream of the $i^{th}$ frame, the video stream of the $i^{th}$ frame is obtained by encoding the ROI and a non-ROI included in the $i^{th}$ frame, the ROI characteristic stream of the $i^{th}$ frame is obtained by encoding characteristic information of the at least one ROI macroblock according to the QP corresponding to each ROI macroblock, and the characteristic information includes location information and type information of the at least one ROI macroblock.

Step 302: Obtain the QP corresponding to each ROI macroblock and the ROI characteristic stream of the $i^{th}$ frame that are included in the video stream of the $i^{th}$ frame.

Step 303: Decode the obtained ROI characteristic stream of the $i^{th}$ frame according to the obtained QP corresponding to each ROI macroblock, to obtain the characteristic information of the at least one ROI macroblock and further obtain the location information and the type information of the at least one ROI macroblock.

Preferably, a frame header of the video stream of the $i^{th}$ frame carries the quantization parameter QP corresponding to each ROI macroblock and the ROI characteristic stream of the $i^{th}$ frame.

Correspondingly, step 302 includes:

obtaining the QP corresponding to each ROI macroblock and the ROI characteristic stream of the $i^{th}$ frame from the frame header of the video stream of the $i^{th}$ frame.

During specific implementation, step 303 of decoding the ROI characteristic stream of the $i^{th}$ frame may be performed by using a decoding method corresponding to the UVLC in the method embodiment shown in FIG. 1A. Details are not described again.

It should be noted that, after the location information and the type information corresponding to the at least one ROI macroblock are obtained by decoding, the QP corresponding to each ROI macroblock may be determined according to the type information, and a QP corresponding to the non-ROI may be determined according to a value specified between an encoder end and a decoder end. For example, the QP corresponding to the non-ROI may be specified as 48. The QP corresponding to the ROI may be adjusted according to a priority of the type information of the ROI macroblock. A QP corresponding to an ROI macroblock with a higher priority is 24, and a QP corresponding to an ROI macroblock with a lower priority may be 36. Therefore, the video stream of the $i^{th}$ frame may be decoded according to the QP corresponding to each ROI macroblock and the QP corresponding to the non-ROI macroblock, to obtain a reconstructed frame of the $i^{th}$ frame.

In this method embodiment, the ROI characteristic stream of the $i^{th}$ frame and the QP corresponding to each ROI macroblock of the $i^{th}$ frame are received while the video stream of the $i^{th}$ frame is received, so that the ROI characteristic stream is decoded according to the QP corresponding to each ROI macroblock, to obtain the characteristic information of the ROI macroblock and further obtain the location information and the type information of the ROI macroblock. This improves accuracy of obtaining the characteristic information of the ROI macroblock by decoding. In addition, the characteristic information of the ROI macroblock is directly obtained by decoding, thereby improving efficiency of obtaining the ROI information by decoding.

Figure 4:
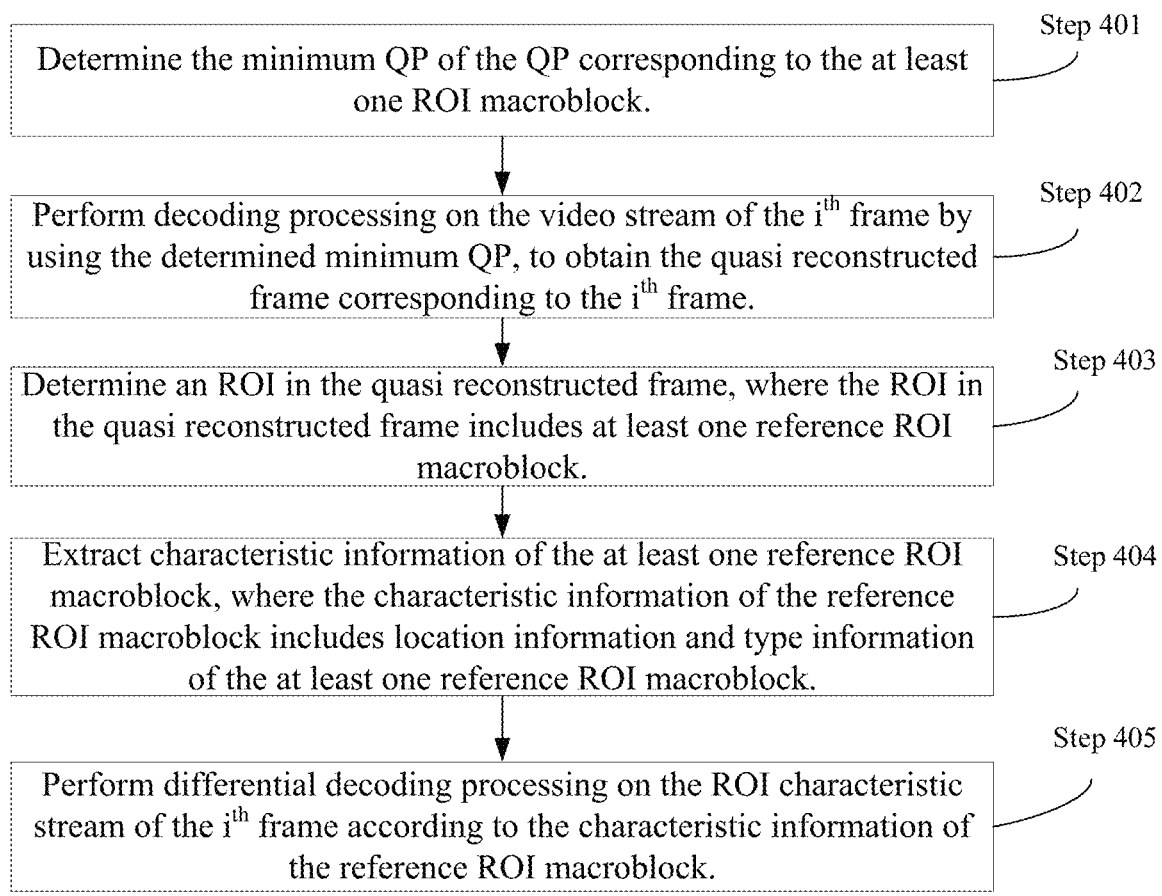
FIG. 4 is a flowchart of Embodiment 2 of an ROI information decoding method according to an embodiment of the present invention.

FIG. 4 is a flowchart of Embodiment 2 of an ROI information decoding method according to an embodiment of the present invention. This embodiment is a preferred implementation of step 303 of decoding the ROI characteristic stream of the $i^{th}$ frame in the method embodiment shown in FIG. 3. The ROI characteristic stream of the $i^{th}$ frame is obtained by performing differential encoding on the characteristic information of the at least one ROI macroblock according to characteristic information of a reference ROI macroblock, included in a quasi reconstructed frame corresponding to the $i^{th}$ frame, of the at least one ROI macroblock. The quasi reconstructed frame is obtained by decoding the video stream of the $i^{th}$ frame by using a minimum QP of the QP corresponding to the at least one ROI macroblock. As shown in FIG. 4, this method embodiment includes the following steps.

Step 401: Determine the minimum QP of the QP corresponding to the at least one ROI macroblock.

Step 402: Perform decoding processing on the video stream of the $i^{th}$ frame by using the determined minimum QP, to obtain the quasi reconstructed frame corresponding to the $i^{th}$ frame.

Step 403: Determine an ROI in the quasi reconstructed frame, where the ROI in the quasi reconstructed frame includes at least one reference ROI macroblock.

Step 404: Extract characteristic information of the at least one reference ROI macroblock, where the characteristic information of the reference ROI macroblock includes location information and type information of the at least one reference ROI macroblock.

Step 405: Perform differential decoding processing on the ROI characteristic stream of the $i^{th}$ frame according to the characteristic information of the reference ROI macroblock.

Further, the ROI characteristic stream of the $i^{th}$ frame includes a quantity of reference ROI macroblocks that are included in the ROI in the quasi reconstructed frame. The ROI characteristic stream of the $i^{th}$ frame includes a same quantity of basic unit codes. The basic unit code is obtained by performing differential encoding on the characteristic information of the at least one ROI macroblock by using each reference ROI macroblock as a basic unit. The basic unit code includes a quantity corresponding to the reference ROI macroblock and a corresponding quantity of differential encoding segments. The differential encoding segment includes characteristic information differences between the ROI macroblock and the reference ROI macroblock. The characteristic information differences include location information differences and a type information difference. The corresponding quantity is a quantity of ROI macroblocks that have a minimum location difference from the reference ROI macroblock.

Correspondingly, step 405 includes:

extracting the quantity of reference ROI macroblocks that is included in the ROI characteristic stream of the $i^{th}$ frame;

splitting, according to the extracted quantity of reference ROI macroblocks, the ROI characteristic stream of the $i^{th}$ frame into basic decoding units whose quantity is the same as the quantity of reference ROI macroblocks, where the basic decoding unit includes the quantity corresponding to the reference ROI macroblock and a corresponding quantity of differential decoding segments, and the differential decoding segment includes the characteristic information differences between the ROI macroblock and the reference ROI macroblock;

extracting the quantity corresponding to the reference ROI macroblock from the basic decoding unit;

splitting the basic decoding unit into a corresponding quantity of differential decoding segments according to the extracted corresponding quantity; and decoding the differential decoding segments according to the characteristic information of the reference ROI macroblock, to obtain characteristic information of a corresponding quantity of ROI macroblocks.

In the foregoing decoding process, characteristic information of a reference ROI macroblock corresponding to each basic decoding unit may be sequentially obtained, according to a video frame scanning manner that is the same as that at the encoder end, from the characteristic information of each reference ROI macroblock that is extracted from the quasi reconstructed frame obtained by decoding. Because the encoder end and the decoder end obtain the quasi reconstructed frame for the video stream of the $i^{th}$ frame by using the same minimum QP, consistency of the reference ROI macroblock in the quasi reconstructed frame and the characteristic information of the reference ROI macroblock can be ensured, and further, accuracy of obtaining the characteristic information of the ROI macroblock by decoding can be ensured.

Preferably, the differential decoding segment further includes a flag bit, where the flag bit is used to indicate whether the location information differences are all 0.

Correspondingly, this method embodiment further includes:

extracting the flag bit included in the differential decoding segment;

determining whether the extracted flag bit indicates that the location information differences are all 0; and if yes, using the characteristic information of the reference ROI macroblock as the characteristic information of the ROI macroblock, and skipping the step of decoding the differential decoding segment according to the characteristic information of the reference ROI macroblock.

Preferably, this method embodiment further includes:

if the extracted corresponding quantity is 0, skipping decoding processing on the basic decoding unit.

It should be noted that, provided that a quantity equal to the quantity of ROI macroblocks corresponding to the reference ROI macroblock minus 1 is encoded during encoding, if the extracted corresponding quantity is a negative number, the decoding processing on the basic decoding unit is skipped.

Specifically, the decoding step in this method embodiment is a reverse process of the encoding step in the method embodiment shown in FIG. 2A. Technical effects are similar, and details are not described again.

Figure 5:
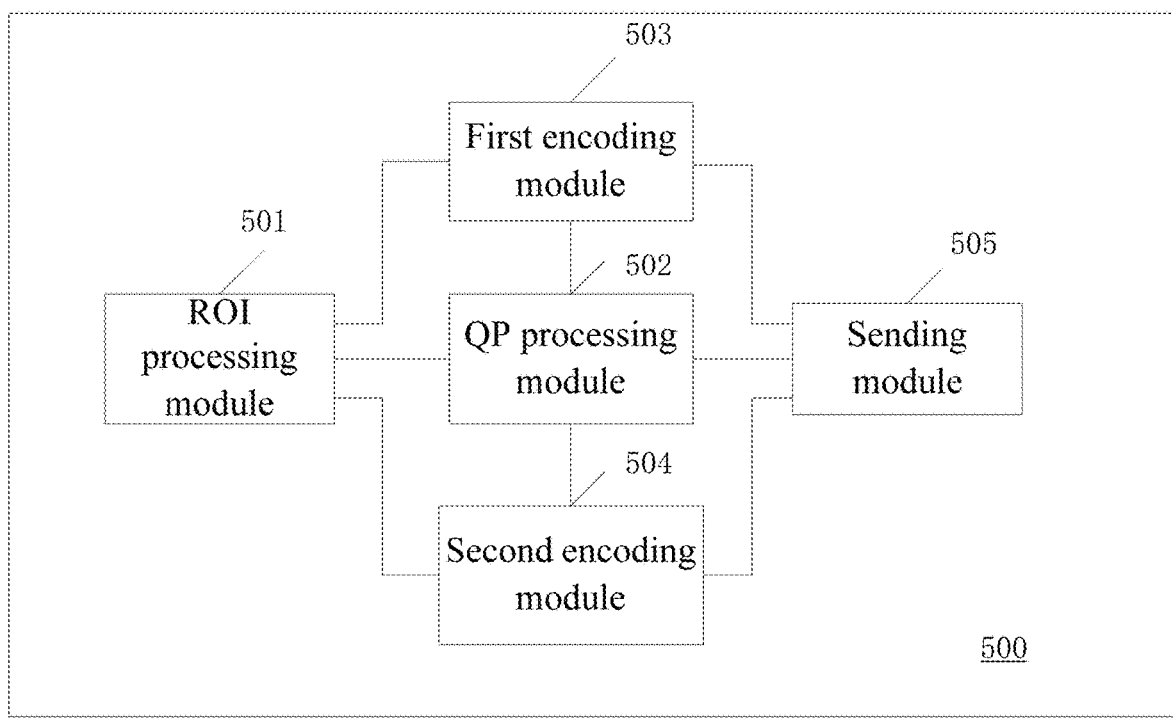
FIG. 5 is a schematic structural diagram of Embodiment 1 of a video encoding apparatus according to an embodiment of the present invention.

FIG. 5 is a schematic structural diagram of Embodiment 1 of a video encoding apparatus according to an embodiment of the present invention. As shown in FIG. 5, the video encoding apparatus 500 includes an ROI processing module 501, a QP processing module 502, a first encoding module 503, a second encoding module 504, and a sending module 505.

The ROI processing module 501 is configured to: determine a range of interes ROI in an $i^{th}$ frame, where the ROI includes at least one ROI macroblock; and extract characteristic information of the at least one ROI macroblock, where the characteristic information includes location information and type information of the at least one ROI macroblock.

The QP processing module 502 is configured to determine a quantization parameter QP corresponding to each of the at least one ROI macroblock.

The first encoding module 503 is configured to encode the characteristic information of the at least one ROI macroblock according to the determined QP corresponding to each ROI macroblock, to obtain an ROI characteristic stream of the $i^{th}$ frame.

The second encoding module 504 is configured to encode the ROI and a non-ROI included in the $i^{th}$ frame to obtain a video stream of the $i^{th}$ frame.

The sending module 505 is configured to add the QP corresponding to each ROI macroblock and the ROI characteristic stream of the $i^{th}$ frame to the video stream of the $i^{th}$ frame, to perform sending.

Further, the QP processing module 502 is specifically configured to adjust the QP corresponding to each of the at least one ROI macroblock according to type information of each ROI macroblock, where as a priority corresponding to the type information of the ROI macroblock becomes higher, the QP corresponding to the ROI macroblock becomes smaller.

Preferably, the sending module 505 is specifically configured to add the QP corresponding to each ROI macroblock and the ROI characteristic stream of the $i^{th}$ frame to a frame header of the ROI video stream of the $i^{th}$ frame, to perform sending.

The video encoding apparatus 500 provided in this embodiment may be configured to perform the encoding step in the method embodiment shown in FIG. 1A. Implementation principles and technical effects thereof are similar, and details are not described again.

Figure 6:
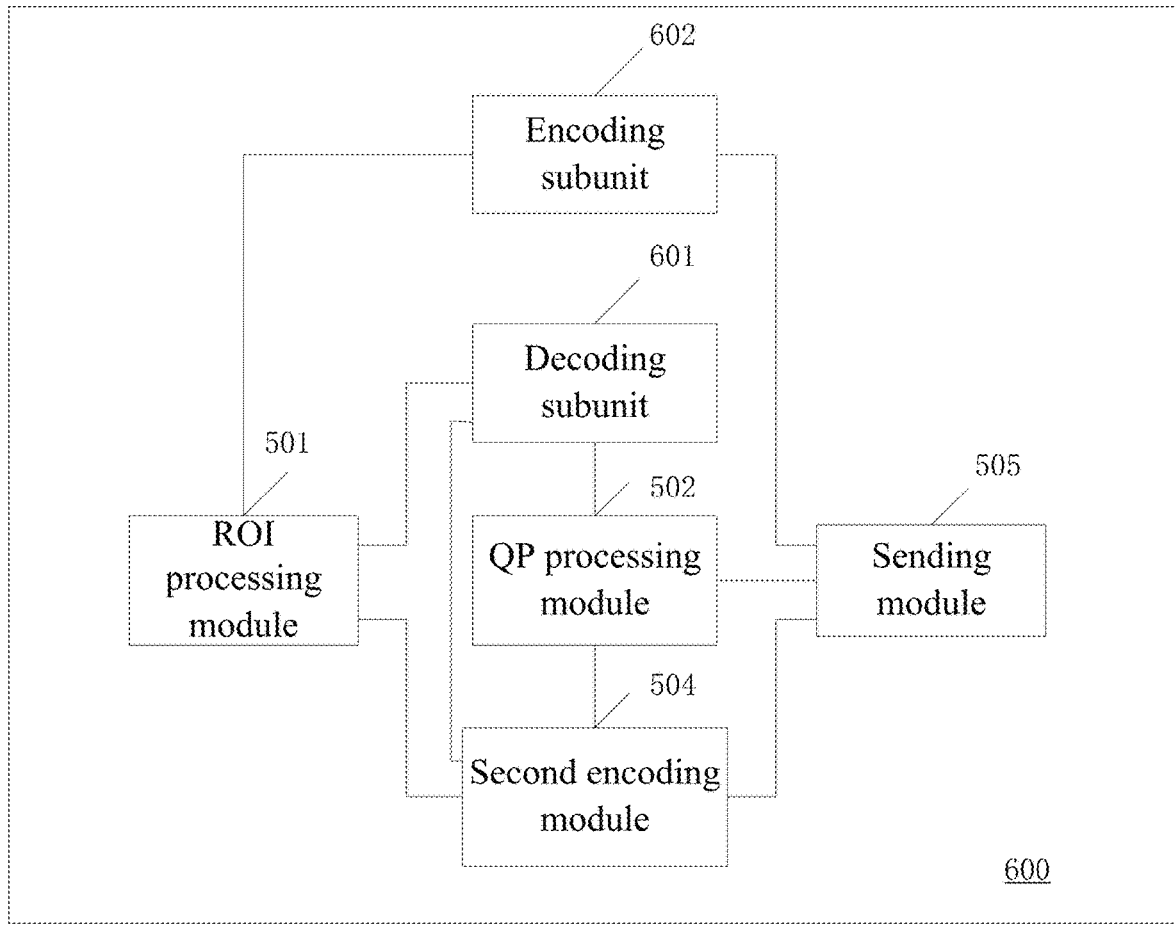
FIG. 6 is a schematic structural diagram of Embodiment 2 of a video encoding apparatus according to an embodiment of the present invention.

FIG. 6 is a schematic structural diagram of Embodiment 2 of a video encoding apparatus according to an embodiment of the present invention. As shown in FIG. 6, the video encoding apparatus 600 has a structure similar to that of the video encoding apparatus shown in FIG. 5. Implementation principles of modules having a same number are the same, and details are not described again. A decoding subunit 601 and an encoding subunit 602 included in the video encoding apparatus 600 are preferred implementations of the first encoding module 503 included in the video encoding apparatus 500 shown in FIG. 5.

The decoding subunit 601 is configured to decode the video stream of the $i^{th}$ frame by using a minimum QP of the QP corresponding to the at least one ROI macroblock, to obtain a quasi reconstructed frame corresponding to the $i^{th}$ frame.

The ROI processing module 501 is further configured to: determine an ROI in the quasi reconstructed frame, where the ROI in the quasi reconstructed frame includes at least one reference ROI macroblock of the ROI macroblock; and extract characteristic information of the reference ROI macroblock, where the characteristic information of the reference ROI macroblock includes location information and type information of the at least one reference ROI macroblock.

The encoding subunit 602 is configured to perform differential encoding on the characteristic information of the at least one ROI macroblock according to the characteristic information of the reference ROI macroblock.

Further, the encoding subunit 602 is specifically configured to:

determine, in the at least one reference ROI macroblock of the ROI macroblock, a reference ROI macroblock corresponding to each ROI macroblock, where there is a minimum location difference between the ROI macroblock and the corresponding reference ROI macroblock;

determine a quantity corresponding to each reference ROI macroblock, where the corresponding quantity is a quantity of ROI macroblocks corresponding to the reference ROI macroblock; and perform differential encoding on the characteristic information of the at least one ROI macroblock by using each reference ROI macroblock as a basic unit, to obtain a basic unit code; encode, into the basic unit code, the quantity corresponding to the reference ROI macroblock and a corresponding quantity of differential encoding segments; and encode, into the differential encoding segment, characteristic information differences between the ROI macroblock and the reference ROI macroblock, where the characteristic information differences include location information differences and a type information difference.

Further, the ROI processing module 501 is further configured to determine a quantity of reference ROI macroblocks included in the ROI in the quasi reconstructed frame.

The encoding subunit 602 is further configured to encode the quantity of reference ROI macroblocks into the ROI characteristic stream of the $i^{th}$ frame, where the ROI characteristic stream of the $i^{th}$ frame includes basic unit codes whose quantity is the same as the quantity of reference ROI macroblocks.

Preferably, the encoding subunit 602 is further configured to:

encode a flag bit into the differential encoding segment, where the flag bit is used to indicate whether the location information differences included in the characteristic information differences are all 0.

If the location information differences are all 0, the encoding subunit 602 skips the step of encoding, into the differential encoding segment, characteristic information differences between the ROI macroblock and the reference ROI macroblock.

The video encoding apparatus 600 provided in this embodiment may be configured to perform the encoding step in the method embodiment shown in FIG. 2A. Implementation principles and technical effects thereof are similar, and details are not described again.

Figure 7:
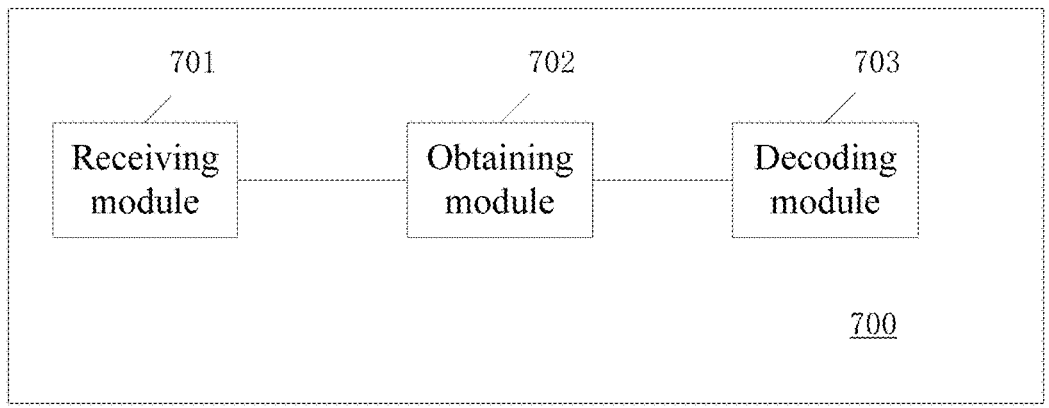
FIG. 7 is a schematic structural diagram of Embodiment 1 of a video decoding apparatus according to an embodiment of the present invention.

FIG. 7 is a schematic structural diagram of Embodiment 1 of a video decoding apparatus according to an embodiment of the present invention. As shown in FIG. 7, the video decoding apparatus 700 includes a receiving module 701, an obtaining module 702, and a decoding module 703.

The receiving module 701 is configured to receive a video stream of an $i^{th}$ frame, where the $i^{th}$ frame includes a range of interest ROI, the ROI includes at least one ROI macroblock, the video stream of the $i^{th}$ frame carries a quantization parameter QP corresponding to each ROI macroblock and an ROI characteristic stream of the $i^{th}$ frame, the video stream of the $i^{th}$ frame is obtained by encoding the ROI and a non-ROI included in the $i^{th}$ frame, the ROI characteristic stream of the $i^{th}$ frame is obtained by encoding characteristic information of the at least one ROI macroblock according to the QP corresponding to each ROI macroblock, and the characteristic information includes location information and type information of the at least one ROI macroblock.

The obtaining module 702 is configured to obtain the QP corresponding to each ROI macroblock and the ROI characteristic stream of the $i^{th}$ frame that are included in the video stream of the $i^{th}$ frame.

The decoding module 703 is configured to decode the obtained ROI characteristic stream of the $i^{th}$ frame according to the QP corresponding to each ROI macroblock that is obtained by the obtaining module, to obtain the characteristic information of the at least one ROI macroblock and further obtain the location information and the type information of the at least one ROI macroblock.

Preferably, a frame header of the video stream of the $i^{th}$ frame carries the quantization parameter QP corresponding to each ROI macroblock and the ROI characteristic stream of the $i^{th}$ frame.

Correspondingly, the obtaining module 702 is specifically configured to obtain the QP corresponding to each ROI macroblock and the ROI characteristic stream of the $i^{th}$ frame from the frame header of the video stream of the $i^{th}$ frame.

The video decoding apparatus 700 provided in this embodiment may be configured to perform the decoding step in the method embodiment shown in FIG. 3. Implementation principles and technical effects thereof are similar, and details are not described again.

Figure 8:
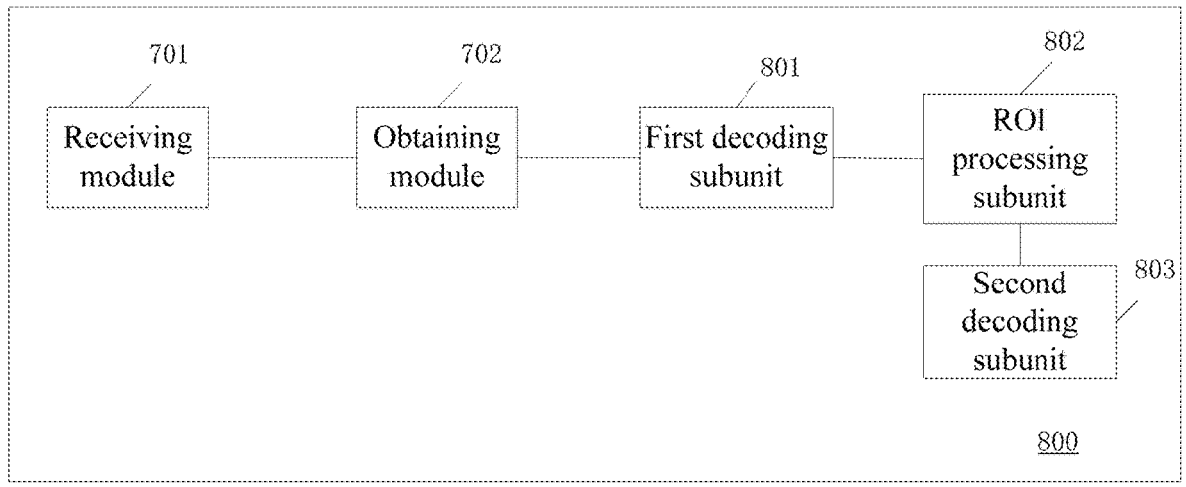
FIG. 8 is a schematic structural diagram of Embodiment 2 of a video decoding apparatus according to an embodiment of the present invention.

FIG. 8 is a schematic structural diagram of Embodiment 2 of a video decoding apparatus according to an embodiment of the present invention. In this embodiment, the ROI characteristic stream of the $i^{th}$ frame is obtained by performing differential encoding on the characteristic information of the at least one ROI macroblock according to characteristic information of a reference ROI macroblock, included in a quasi reconstructed frame corresponding to the $i^{th}$ frame, of the at least one ROI macroblock. The quasi reconstructed frame is obtained by decoding the video stream of the $i^{th}$ frame by using a minimum QP of the QP corresponding to the at least one ROI macroblock. As shown in FIG. 8, the video decoding apparatus 800 includes a first decoding subunit 801, an ROI processing subunit 802, and a second decoding subunit 803, which are preferred implementations of the decoding module 703 included in the video decoding apparatus shown in FIG. 7.

The first decoding subunit 801 is configured to: determine the minimum QP in the QP corresponding to the at least one ROI macroblock that is obtained by the obtaining module; and perform decoding processing on the video stream of the $i^{th}$ frame by using the determined minimum QP, to obtain the quasi reconstructed frame corresponding to the $i^{th}$ frame.

The ROI processing subunit 802 is configured to: determine an ROI in the quasi reconstructed frame, where the ROI in the quasi reconstructed frame includes at least one reference ROI macroblock; and extract characteristic information of the at least one reference ROI macroblock, where the characteristic information of the reference ROI macroblock includes location information and type information of the at least one reference ROI macroblock.

The second decoding subunit 803 is configured to perform differential decoding processing on the ROI characteristic stream of the $i^{th}$ frame according to the characteristic information of the reference ROI macroblock.

Further, the ROI characteristic stream of the $i^{th}$ frame includes a quantity of reference ROI macroblocks that are included in the ROI in the quasi reconstructed frame. The ROI characteristic stream of the $i^{th}$ frame includes a same quantity of basic unit codes. The basic unit code is obtained by performing differential encoding on the characteristic information of the at least one ROI macroblock by using each reference ROI macroblock as a basic unit. The basic unit code includes a quantity corresponding to the reference ROI macroblock and a corresponding quantity of differential encoding segments. The differential encoding segment includes characteristic information differences between the ROI macroblock and the reference ROI macroblock. The characteristic information differences include location information differences and a type information difference. The corresponding quantity is a quantity of ROI macroblocks that have a minimum location difference from the reference ROI macroblock.

Correspondingly, the second decoding subunit 803 is specifically configured to:

extract the quantity of reference ROI macroblocks that is included in the ROI characteristic stream of the $i^{th}$ frame;

split, according to the extracted quantity of reference ROI macroblocks, the ROI characteristic stream of the $i^{th}$ frame into basic decoding units whose quantity is the same as the quantity of reference ROI macroblocks, where the basic decoding unit includes the quantity corresponding to the reference ROI macroblock and a corresponding quantity of differential decoding segments, and the differential decoding segment includes the characteristic information differences between the ROI macroblock and the reference ROI macroblock;

extract the quantity corresponding to the reference ROI macroblock from the basic decoding unit;

split the basic decoding unit into a corresponding quantity of differential decoding segments according to the extracted corresponding quantity; and decode the differential decoding segments according to the characteristic information of the reference ROI macroblock, to obtain characteristic information of a corresponding quantity of ROI macroblocks.

Preferably, the differential decoding segment further includes a flag bit, where the flag bit is used to indicate whether the location information differences are all 0.

Correspondingly, the second decoding subunit is further configured to:

extract the flag bit included in the differential decoding segment;

determine whether the extracted flag bit indicates that the location information differences are all 0; and if yes, use the characteristic information of the reference ROI macroblock as the characteristic information of the ROI macroblock, and skip the step of decoding the differential decoding segment according to the characteristic information of the reference ROI macroblock.

The video decoding apparatus 800 provided in this embodiment may be configured to perform the decoding step in the method embodiment shown in FIG. 4. Implementation principles and technical effects thereof are similar, and details are not described again.

Figure 9:
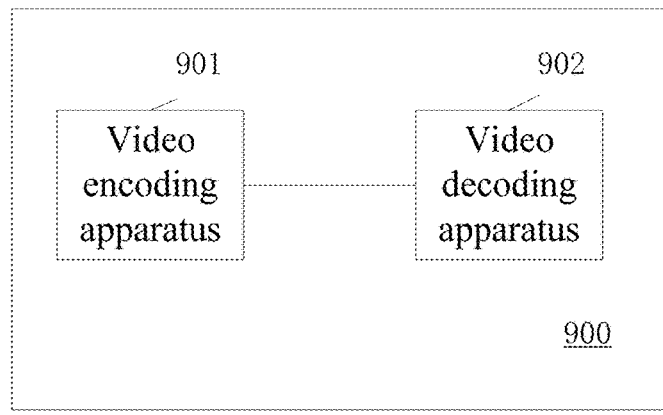
FIG. 9 is a schematic structural diagram of an embodiment of a video encoding and decoding system according to an embodiment of the present invention.

FIG. 9 is a schematic structural diagram of an embodiment of a video encoding and decoding system according to an embodiment of the present invention. As shown in FIG. 9, the video encoding and decoding system includes a video encoding apparatus 901 and a video decoding apparatus 902. The video encoding apparatus 901 may be the video encoding apparatus shown in FIG. 5 or FIG. 6, and may be configured to perform the corresponding encoding step in the method embodiment shown in FIG. 1A or FIG. 2A. The video decoding apparatus 902 may be the video decoding apparatus shown in FIG. 7 or FIG. 8, and may be configured to perform the corresponding decoding step in the method embodiment shown in FIG. 3 or FIG. 4. Implementation principles and technical effects thereof are similar, and details are not described again.

Figure 10:
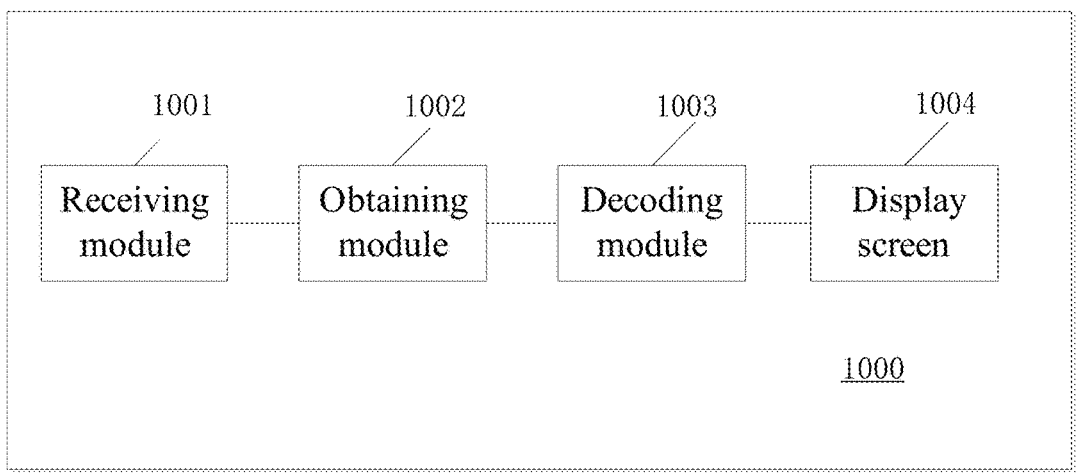
FIG. 10 is a schematic structural diagram of a terminal according to an embodiment of the present invention.

FIG. 10 is a schematic structural diagram of a terminal 1000 according to an embodiment of the present invention. As shown in FIG. 10, the terminal 1000 includes a receiving module 1001, an obtaining module 1002, a decoding module 1003 and a display screen 1004.

The receiving module 1001 is configured to receive a video stream of an $i^{th}$ frame, where the $i^{th}$ frame includes a range of interest ROI, the ROI includes at least one ROI macroblock, the video stream of the $i^{th}$ frame carries a quantization parameter QP corresponding to each ROI macroblock and an ROI characteristic stream of the $i^{th}$ frame, the video stream of the $i^{th}$ frame is obtained by encoding the ROI and a non-ROI included in the $i^{th}$ frame, the ROI characteristic stream of the $i^{th}$ frame is obtained by encoding characteristic information of the at least one ROI macroblock according to the QP corresponding to each ROI macroblock, and the characteristic information includes location information and type information of the at least one ROI macroblock.

The obtaining module 1002 is configured to obtain the QP corresponding to each ROI macroblock and the ROI characteristic stream of the $i^{th}$ frame that are included in the video stream of the $i^{th}$ frame.

The decoding module 1003 is configured to decode the obtained ROI characteristic stream of the $i^{th}$ frame according to the QP corresponding to each ROI macroblock that is obtained by the obtaining module, to obtain the characteristic information of the at least one ROI macroblock and further obtain the location information and the type information of the at least one ROI macroblock.

The display screen 1004 is configured to play and display the video stream accruing to the location information and the type information obtained by the decoding module 1003.

Figure 11:
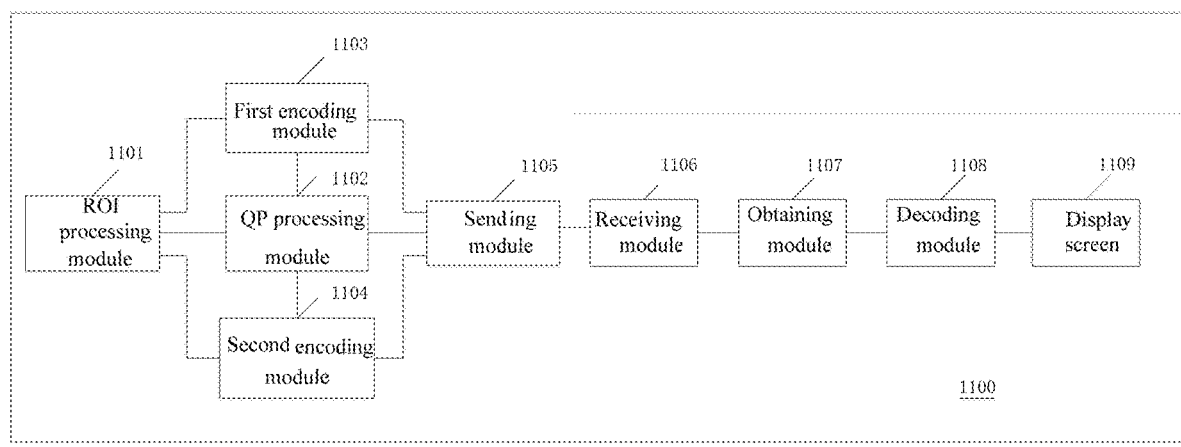
FIG. 11 is a schematic structural diagram of a of an embodiment of a video encoding and decoding system according to an embodiment of the present invention.

FIG. 11 is a schematic structural diagram of a of an embodiment of a video encoding and decoding system according to an embodiment of the present invention. As shown in FIG. 11, the video encoding and decoding system includes an ROI processing module 1101, a QP processing module 1102, a first encoding module 1103, a second encoding module 1104, a sending module 1105, receiving module 1106, an obtaining module 1107, a decoding module 1108 and a display screen 1109.

The ROI processing module 1101 is configured to: determine a range of interest ROI in an $i^{th}$ frame, where the ROI includes at least one ROI macroblock; and extract characteristic information of the at least one ROI macroblock, where the characteristic information includes location information and type information of the at least one ROI macroblock.

The QP processing module 1102 is configured to determine a quantization parameter QP corresponding to each of the at least one ROI macroblock.

The first encoding module 1103 is configured to encode the characteristic information of the at least one ROI macroblock according to the determined QP corresponding to each ROI macroblock, to obtain an ROI characteristic stream of the $i^{th}$ frame.

The second encoding module 1104 is configured to encode the ROI and a non-ROI included in the $i^{th}$ frame to obtain a video stream of the $i^{th}$ frame.

The sending module 1105 is configured to add the QP corresponding to each ROI macroblock and the ROI characteristic stream of the $i^{th}$ frame to the video stream of the $i^{th}$ frame, to perform sending.

The receiving module 1106 is configured to receive a video stream of an $i^{th}$ frame, where the $i^{th}$ frame includes a range of interest ROI, the ROI includes at least one ROI macroblock, the video stream of the $i^{th}$ frame carries a quantization parameter QP corresponding to each ROI macroblock and an ROI characteristic stream of the $i^{th}$ frame, the video stream of the $i^{th}$ frame is obtained by encoding the ROI and a non-ROI included in the $i^{th}$ frame, the ROI characteristic stream of the $i^{th}$ frame is obtained by encoding characteristic information of the at least one ROI macroblock according to the QP corresponding to each ROI macroblock, and the characteristic information includes location information and type information of the at least one ROI macroblock.

The obtaining module 1107 is configured to obtain the QP corresponding to each ROI macroblock and the ROI characteristic stream of the $i^{th}$ frame that are included in the video stream of the $i^{th}$ frame.

The decoding module 1108 is configured to decode the obtained ROI characteristic stream of the $i^{th}$ frame according to the QP corresponding to each ROI macroblock that is obtained by the obtaining module, to obtain the characteristic information of the at least one ROI macroblock and further obtain the location information and the type information of the at least one ROI macroblock.

The display screen 1109 is configured to play and display the video stream accruing to the location information and the type information obtained by the decoding module 1108.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a Read Only Memory (ROM), a Random Access Memory (RAM), a magnetic disk, and an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A video encoding method, comprising:
   determining a range of interest ROI in an $i^{th}$ frame, wherein the ROI comprises at least one ROI macroblock;
   extracting characteristic information of the at least one ROI macroblock, wherein the characteristic information comprises location information and type information of the at least one ROI macroblock;
   determining a quantization parameter QP corresponding to each of the at least one ROI macroblock;
   encoding the characteristic information of the at least one ROI macroblock according to the determined QP corresponding to each ROI macroblock, to obtain an ROI characteristic stream of the $i^{th}$ frame; and
   adding, to a video stream of the $i^{th}$ frame, the QP corresponding to each ROI macroblock and the ROI characteristic stream of the $i^{th}$ frame, to perform sending, wherein the video stream of the $i^{th}$ frame is obtained by encoding the ROI and a non-ROI comprised in the $i^{th}$ frame;
   wherein the determining a quantization parameter QP corresponding to each of the at least one ROI macroblock comprises:
   adjusting the QP corresponding to each of the at least one ROI macroblock according to type information of the ROI macroblock, wherein as a priority corresponding to the type information of the ROI macroblock becomes higher, the QP corresponding to the ROI macroblock becomes smaller;
   and wherein encoding the characteristic information of the at least one ROI macroblock according to the determined QP corresponding to each ROI macroblock comprises:
   decoding the video stream of the $i^{th}$ frame by using a minimum QP of the QP corresponding to the at least one ROI macroblock, to obtain a quasi reconstructed frame corresponding to the $i^{th}$ frame;
   determining an ROI in the quasi reconstructed frame, where the ROI in the quasi reconstructed frame includes at least one reference ROI macroblock of the ROI macroblock;
   extracting characteristic information of the reference ROI macroblock, wherein the characteristic information of the reference ROI macroblock includes location information and type information of the at least one reference ROI macroblock;
   and performing differential encoding on the characteristic information of the at least one ROI macroblock according to the characteristic information of the reference ROI macroblock;
   and wherein the adding, to a video stream of the $i^{th}$ frame, the QP corresponding to each ROI macroblock and the ROI characteristic stream of the $i^{th}$ frame, to perform sending comprises:
   adding, to a frame header of the ROI video stream of the $i^{th}$ frame, the QP corresponding to each ROI macroblock and the ROI characteristic stream of the $i^{th}$ frame, to perform sending;
   and wherein the performing differential encoding on the characteristic information of the at least one ROI macroblock according to the characteristic information of the reference ROI macroblock comprises:
   determining, in the at least one reference ROI macroblock of the ROI macroblock, a reference ROI macroblock corresponding to each ROI macroblock, wherein there is a minimum location difference between the ROI macroblock and the corresponding reference ROI macroblock;
   determining a quantity corresponding to each reference ROI macroblock, wherein the corresponding quantity is a quantity of ROI macroblocks corresponding to the reference ROI macroblock; and
   performing differential encoding on the characteristic information of the at least one ROI macroblock by using each reference ROI macroblock as a basic unit, to obtain a basic unit code; encoding, into the basic unit code, the quantity corresponding to the reference ROI macroblock and a corresponding quantity of differential encoding segments; and encoding, into the differential encoding segment, characteristic information differences between the ROI macroblock and the reference ROI macroblock, wherein the characteristic information differences include location information differences and a type information difference;
   wherein the method further comprises:
   determining a quantity of reference ROI macroblocks included in the ROI in the quasi reconstructed frame; and
   encoding the quantity of reference ROI macroblocks into the ROI characteristic stream of the $i^{th}$ frame, where the ROI characteristic stream of the $i^{th}$ frame includes basic unit codes whose quantity is the same as the quantity of reference ROI macroblocks;

encoding a flag bit into the differential encoding segment, where the flag bit is used to indicate whether the location information differences included in the characteristic information differences are all 0, wherein different values or characters is assigned to the flag bit at an encoder end and a decoder end;

and if the location information differences are all 0, the step of encoding, into the differential encoding segment, characteristic information differences between the ROI macroblock and the reference ROI macroblock is skipped;

wherein a virtual decoder is used to decode, by using the minimum QP of the $i^{th}$ frame, an encoded video stream to obtain the quasi reconstructed frame, the ROI in the quasi reconstructed frame is determined, at least one macroblock included in the ROI is used as the reference ROI macroblock of the ROI macroblock of the $i^{th}$ frame, the characteristic information of each reference ROI macroblock is extracted, and the characteristic information of the reference ROI macroblock is used as reference characteristic information for subsequently performing differential encoding on the characteristic information of the ROI macroblock of the $i^{th}$ frame.

* * * * *